United States Patent
Pijpstra et al.

(10) Patent No.: US 10,184,593 B2
(45) Date of Patent: Jan. 22, 2019

(54) FIRE STOP SLEEVE, PARTITION PROVIDED WITH FIRE STOP SLEEVE AND METHOD FOR INSTALLATION FOR STOP SLEEVE

(71) Applicant: J. van Walraven Holding B.V., Mijdrecht (NL)

(72) Inventors: Ronald Pijpstra, Utrecht (NL); Frank Nijdam, Zeewolde (NL)

(73) Assignee: J. van Walraven Holding B.V., Mijdrecht (NL)

( * ) Notice: Subject to any disclaimer, the term of this patent is extended or adjusted under 35 U.S.C. 154(b) by 0 days.

(21) Appl. No.: 15/326,075

(22) PCT Filed: Jul. 6, 2015

(86) PCT No.: PCT/NL2015/050495
§ 371 (c)(1),
(2) Date: Jan. 13, 2017

(87) PCT Pub. No.: WO2016/010420
PCT Pub. Date: Jan. 21, 2016

(65) Prior Publication Data
US 2017/0204999 A1    Jul. 20, 2017

(30) Foreign Application Priority Data

Jul. 17, 2014 (NL) ..................... 2013206

(51) Int. Cl.
*F16L 5/04* (2006.01)
*A62C 2/06* (2006.01)
(Continued)

(52) U.S. Cl.
CPC .............. *F16L 5/04* (2013.01); *A62C 2/065* (2013.01); *E04B 1/941* (2013.01); *E04B 1/948* (2013.01); *H02G 3/22* (2013.01); *H02G 3/0412* (2013.01)

(58) Field of Classification Search
CPC ... F16L 5/04; A62C 2/065; A62C 2/06; H02G 3/22; H02G 3/0412
See application file for complete search history.

(56) References Cited

U.S. PATENT DOCUMENTS 3,137,744 A * 6/1964 Burrus ................ B29C 44/581
220/592.1
5,103,609 A * 4/1992 Thoreson ............... A62C 2/065
52/232

(Continued)

FOREIGN PATENT DOCUMENTS

DE          10043430 A1     3/2002

*Primary Examiner* — Brian D Mattei
*Assistant Examiner* — Daniel J Kenny
(74) *Attorney, Agent, or Firm* — Hoffmann & Baron, LLP

(57) ABSTRACT

A partition is penetrated by a duct. The partition has a passage through which the duct passes. A fire stop sleeve is positioned in the passage and arranged around the duct. The fire stop sleeve includes a casing having a tubular form and one or more elements of intumescent material arranged on a side of the casing facing the duct. The casing is provided with at least one movable retaining member which lies within an outer contour of the casing. The movable retaining member is actuable by intumescent material such that, in the occasion that swelling of the intumescent material occurs, the retaining member is moved radially outward towards engagement with a passage wall in the partition so as to retain the sleeve in the passage.

4 Claims, 4 Drawing Sheets

(51) Int. Cl.
*H02G 3/22* (2006.01)
*E04B 1/94* (2006.01)
*H02G 3/04* (2006.01)

(56) References Cited

U.S. PATENT DOCUMENTS

| | | | |
|---|---|---|---|
| 5,498,466 A * | 3/1996 | Navarro | A62C 2/065 |
| | | | 428/212 |
| 5,947,159 A * | 9/1999 | Takahashi | F16L 5/04 |
| | | | 138/128 |
| 6,725,615 B1 | 4/2004 | Porter | |
| 7,082,730 B2 * | 8/2006 | Monden | F16L 5/04 |
| | | | 138/161 |
| 8,397,452 B2 * | 3/2013 | Stahl, Sr. | H02G 3/0418 |
| | | | 137/79 |
| 2011/0088342 A1 | 4/2011 | Stahl, Sr. et al. | |
| 2011/0210222 A1 | 9/2011 | Van Walraven | |

* cited by examiner

FIRE STOP SLEEVE, PARTITION PROVIDED WITH FIRE STOP SLEEVE AND METHOD FOR INSTALLATION FOR STOP SLEEVE

CROSS-REFERENCE TO RELATED APPLICATIONS

This application is the National Stage of International Application No. PCT/NL2015/050495 filed Jul. 6, 2015, which claims the benefit of Netherlands Application No. NL 2013206, filed Jul. 17, 2014, the contents of which is incorporated by reference herein.

FIELD OF THE INVENTION

The present invention relates to a partition penetrated by a duct, the partition having a passage through which the duct passes, and a fire stop sleeve that is positioned in the passage and arranged around the duct, the fire stop sleeve comprising a casing having a tubular form and one or more elements of intumescent material arranged on a side of the casing facing the duct.

BACKGROUND OF THE INVENTION

Such a partition with fire stop sleeve is known. The fire stop sleeve is arranged around a duct, such as a plastic pipe that passes through a passage hole in a wall or ceiling or other partition that separates two rooms. In case of a fire the intumescent material swells up due to the heat and its pressure makes that the pipe collapses and is closed off for fire and smoke. The casing that surrounds the intumescent material directs the pressure of the swelling material radially inwards. The fire stop sleeve thus seals off the penetrated wall in case of fire such that fire and smoke cannot spread to other rooms.

A problem with fire stop sleeves of this type is that they tend to move axially in case of a fire. The fire causes pressure differences. Also the heat causes elongations and tensions in the pipe material. If the sleeve moves within the passage in the partition the sealing that the sleeve provides through the penetrated wall is compromised.

A common way to retain the sleeve in the passage hole is the use of kit or mortars to fill up the gap between the passage wall and the casing. This is however a laborious solution, because the mortar or kit has to be applied with special tools and surfaces have to be cleaned and prepared to get a good adhesion. Furthermore, normal kits are not fire resistant and weaken due to the heat. Therefore a special heat resistant kit is necessary, which is expensive.

Other fire stop devices are known, in which arms are resiliently attached to a sleeve, which arms engage the passage wall and which are flexed inwards during introducing the sleeve in the passage. The resiliently attached arms however engage the passage wall and thereby hamper the axial movement of the sleeve during the installation.

SUMMARY OF THE INVENTION

The present invention has for an object to provide an alternative for the mortar or kit for axial retention of the fire stop sleeve in the passage of the partition.

This object is achieved by a partition penetrated by a duct, the partition having a passage through which the duct passes, and a fire stop sleeve that is positioned in the passage and arranged around the duct, the fire stop sleeve comprising a casing having a tubular form and one or more elements of intumescent material arranged on a side of the casing facing the duct, wherein the casing is provided with at least one movable retaining member which lies within an outer contour of the casing and which is actuable by intumescent material such that, in the occasion that swelling of the intumescent material occurs, the retaining member is moved radially outward towards engagement with a passage wall in the partition so as to retain the sleeve in the passage.

The fire stop sleeve of the invention is easy to arrange in the passage in the partition and does not get easily stuck, because retention members are not extending radially outward from the sleeve when installing the sleeve. Only in case of fire the retention member is actuated to engage the wall of the passage and retain the sleeve in the passage. The intumescent material expands when heated and presses the retention members outwards. Thus a mechanical retention means is provided which does not hamper the installation of the sleeve, but provides an effective retention of the sleeve in the event that it is crucial, which is in case of fire.

Advantageously the casing of the fire stop sleeve is made of metal, preferably of sheet metal. It is also conceivable to make the casing of another fire proof material such as fire proof plastic.

In a preferred embodiment the retaining member is formed as a lip which is integral with the casing and which is defined by a cutout in the casing, said lip being bendable outwardly with respect to the casing. This embodiment has the advantage that it is easy to manufacture by providing, e.g. by punching out, the cutout in the (metal) sheet from which the casing is made. No assembly of separate retaining members and the casing is necessary. In a possible embodiment the lip is formed in a generally rectangular shape. In another possible embodiment the lip is formed in a generally triangular shape, wherein the base of the triangle constitutes the bending line. Also other shapes such as substantially round, elliptical, polygonal shapes are conceivable.

The lip that is formed in the casing might lie in the plane of the casing. It is however also possible to bend the lip slightly inwards after forming it. The latter is particularly relevant if protrusions or barbs are formed on the lips to improve the ability to engage the passage wall. By bending the lip inwardly it is provided for that the retaining member stays within the contour of the sleeve during installation in the passage.

In a possible embodiment of the invention the retention member can comprise a hook member. The hook member can improve the ability of the retaining member to engage the passage wall. In a possible embodiment the hook member may be an edge portion bended outwards of a lip as described above.

In a possible embodiment the retaining member is made as a separate arm generally shaped as a pin or a bar which is connected to the casing by a hinge. The arm may have a hook member as mentioned above.

In a preferred embodiment the sleeve has multiple retaining members arranged distributed over the surface of the casing.

The retaining members may be arranged in a distribution over a tangential direction of the casing. This ensures a better engagement and a better concentrical arrangement of the sleeve in the passage hole. For example the retaining members may be arranged in a ring pattern.

The retaining members are arranged in a distribution over an axial direction of the casing. To enhance the engagement of the retaining members, there may be provided retaining members which are arranged spaced apart in axial direction of the sleeve.

It is also possible to provide a pattern of retaining members in both a tangential and an axial distribution. This might be done by providing the retaining members in multiple ring configurations which are axially spaced apart. Another option is to provide the retaining members in a helical configuration on the sleeve.

According to another aspect, the invention relates to a fire stop sleeve to be positioned in a passage for a duct through a partition such as a wall or ceiling, the fire stop sleeve comprising a casing and one or more elements of intumescent material arranged on a side of the casing, wherein the casing has a tubular form or is adapted to be brought in a tubular form, such that it can be arranged around a duct, wherein the intumescent material is arranged on the side facing the duct, wherein the casing is provided with at least one movable retaining member which lies within an outer contour of the casing and which is actuable by intumescent material such that, in the occasion that swelling of the intumescent material occurs, it is moved radially outward towards engagement with the passage wall in the partition so as to retain the sleeve in the passage.

Preferred embodiments of this aspect are described herein.

The invention also relates to a method of installation of a fire stop sleeve in a partition such as a wall or a ceiling penetrated by a duct through a passage, the method comprising:
providing a fire stop sleeve comprising a casing and one or more elements of intumescent material arranged on a side of the casing, wherein the casing has a tubular form or is adapted to be brought in a tubular form, the casing being provided with at least one movable retaining member which lies within an outer contour of the casing and which is actuable by intumescent material such that, in the occasion that swelling of the intumescent material occurs, it is moved radially outward towards engagement with the passage wall in the partition so as to retain the sleeve in the passage,
arranging the fire stop sleeve around the duct, wherein the intumescent material is arranged on the side facing the duct,
axially moving the fire stop sleeve along the duct into the passage and positioning the sleeve in the passage.

The invention will be described in more detail in the following description with reference to the drawings.

DETAILED DESCRIPTION OF THE INVENTION

Figure 1:
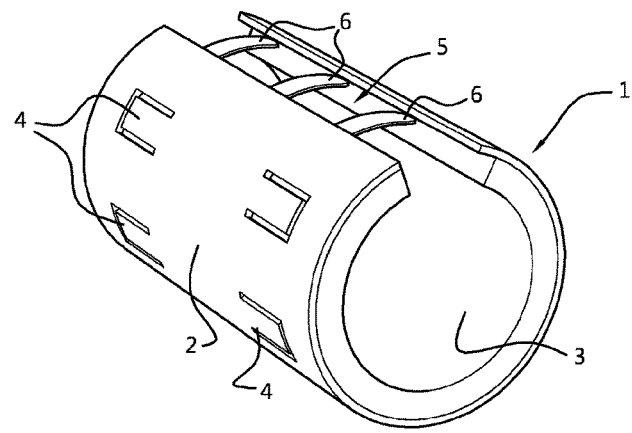
FIG. 1 shows in a view in perspective an embodiment of a fire stop sleeve according to the invention.
Figure 2:
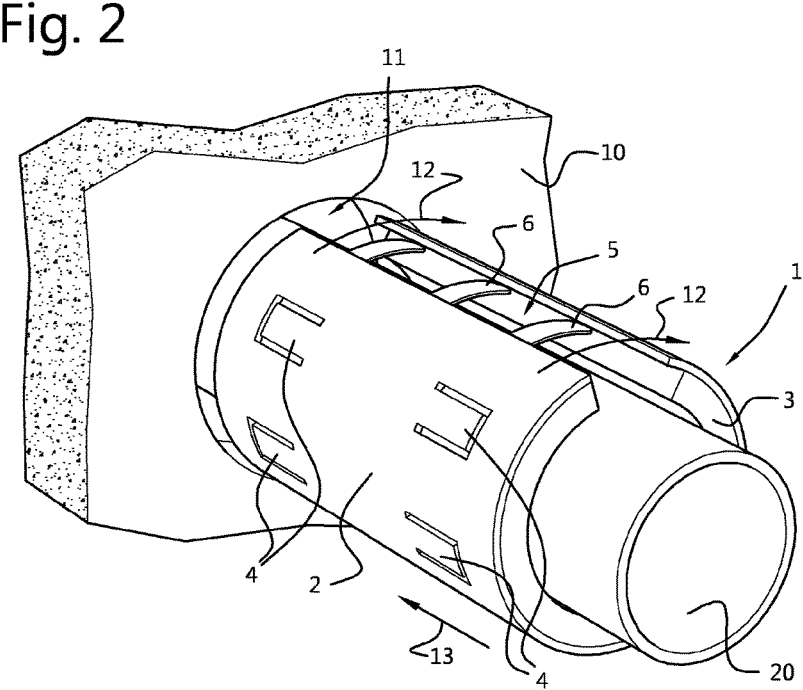
FIG. 2 illustrates how the fire stop sleeve of FIG. 1 is installed around a pipe and in a passage in a partition.

FIG. 1 shows a fire stop sleeve 1. The fire stop sleeve 1 generally has a cylindrical shape and is designed to be arranged around a pipe 20 as is shown in FIG. 2. The fire stop sleeve 1 comprises a casing 2 and a layer of intumescent material 3 arranged on an inner side of the casing 2. The casing 2 is preferably made of metal.

The fire stop sleeve 1 has a slotted longitudinal opening 5 which allows the sleeve 1 to be arranged around a pipe 20 in a direction transverse to the axial direction of the pipe 20. After the sleeve 1 is arranged over the pipe it can be closed as is indicated by arrows 12 in FIG. 2. The casing 2 is in the example shown provided with closure tongues 6 on an edge of the sleeve defining the slot 5. The closure tongues 6 are able to cooperate with slotted holes in the opposing slot defining edge of the sleeve. The tongues 6 can be inserted into said slotted holes and the folded over to retain the sleeve in a closed position around the pipe 20.

After the sleeve 1 is arranged and closed around the pipe, the sleeve 1 is moved along the pipe 20 into the passage 11 in a partition 10 as is indicated by arrow 13 in FIG. 2.

Figure 3:
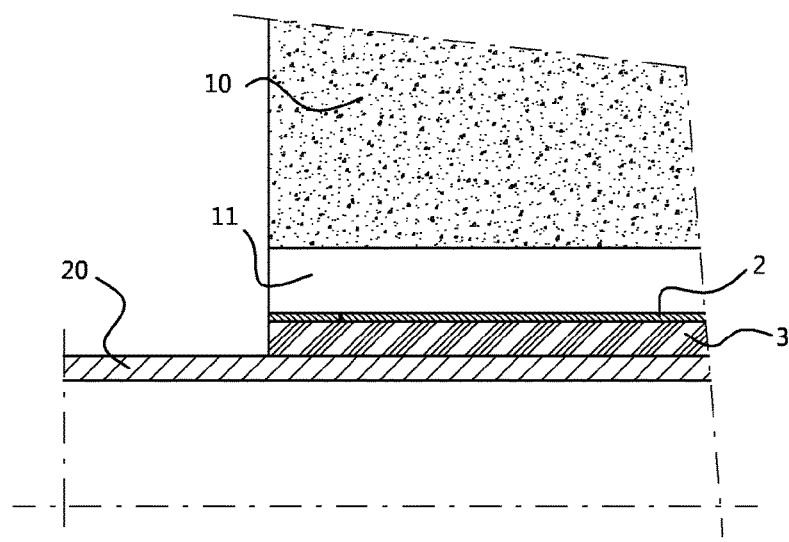
FIG. 3 shows schematically a cross section of a fire stop sleeve according to the invention arranged around a pipe and in a passage.
Figure 4:
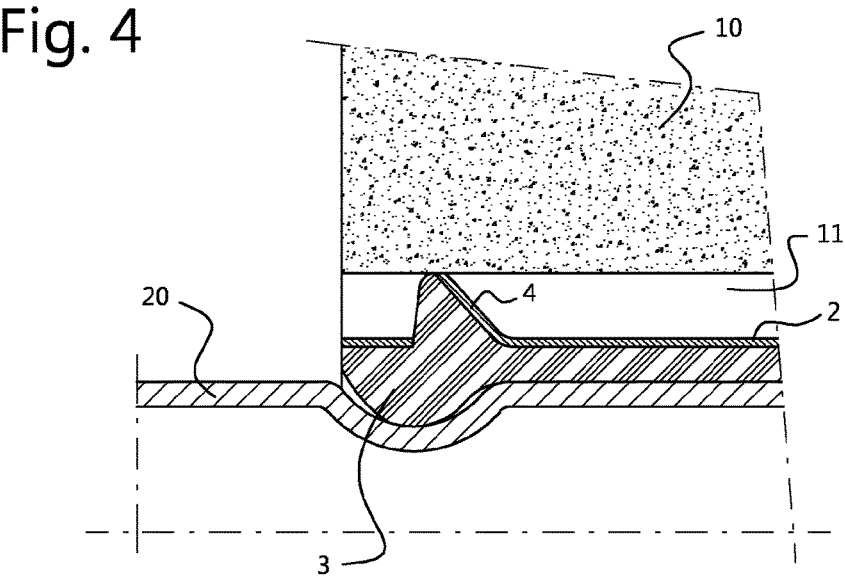
FIG. 4 shows schematically the fire stop sleeve of FIG. 3 in case of a fire.

FIG. 3 and FIG. 4 show in a cross section schematically a partition, e.g. a wall 10 and a passage 11 through the wall 10. The pipe 20 or another duct extends through the passage 11 in the wall 10. The fire stop sleeve 1 is arranged around the pipe 20.

In the example of FIG. 1 the casing 2 is made of sheet metal. Retention members formed as bendable lips 4 are formed in the casing 2. In the shown embodiment the bendable lips 4 are defined by generally U-shaped cutouts. The bending line of the bendable lips 4 extends between the ends of the legs of the U-shaped cutout.

In the example of FIGS. 1 and 2 the casing 2 is provided with two series of bendable lips 4, each series being located near a respective axial end of the casing 2. Each series forms a ring shaped configuration. The ring shaped configuration provides a distribution of retaining members 4 in the tangential direction. The provision of two ring shaped configuration which are axially spaced apart provides a distribution in axial direction of the sleeve.

In FIG. 4 is shown a situation in which the intumescent material 3 expands due to heat during a fire. The expanding intumescent material 3 presses inwardly on the pipe 20 so as to make the pipe 20 collapse and close it off for fire and smoke. On the other hand the expanding intumescent material 3 pushes the bendable lips 4 out of the plane of the casing 2. As is shown the bendable lip 4 engages with its free end the wall of the passage 11 in the wall 10 when it is bent outwards.

Figure 5:
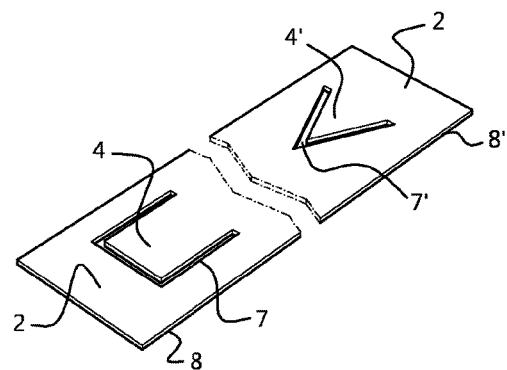
FIG. 5 illustrates a possible shape of a retaining member formed in a sleeve casing, as well as an alternative shape of a retaining member formed in a sleeve casing.

In FIG. 5 is shown a strip of casing material in which a bendable lip 4 with a generally rectangular shape is formed by a generally U-shaped cutout 7. The bending line 8 of the lip 4 extends through the ends of the legs of the U-shaped cutout 7. In the same figure is also given an example of another bendable lip 4'. This bendable lip 4' is substantially triangular. The lip is defined by a generally V-shaped cutout 7'. The bending line 8' of the lip 4' extends through the ends of the legs of the V-shaped cutout 8'.

Also other shapes of lips as shown here are conceivable. For example substantially round, elliptical, or polygonal shapes are possible.

The retention members can also be shaped differently and/or connected differently to the casing. In correspondence with the FIGS. 1-5, in the following embodiments the casing is indicated with reference numeral 2 and the intumescent is indicated with reference numeral 3.

Figure 6:
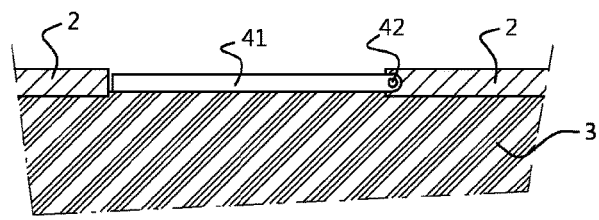
FIG. 6 shows another embodiment of a retaining member arranged in a sleeve casing.

In FIG. 6 is shown an embodiment in which the retention member 41 is formed as a plate shaped member formed separately from the casing that is connected to the casing by a hinge 42.

Figure 7:
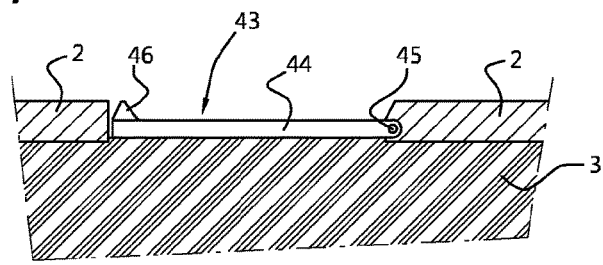
FIGS. 7 and 8 illustrate yet another embodiment of a retaining member arranged in a sleeve casing.
Figure 8:
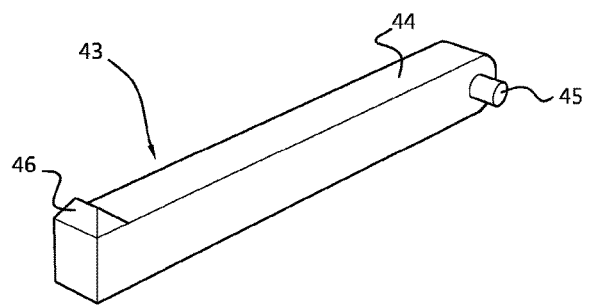

In FIGS. 7 and 8 is shown an embodiment wherein the retention member 43 has a rod shaped body 44. This rod shaped body 44 is connected with one end thereof to the casing 2 by means of a hinge, in this case embodied as a hinge pin 45. The rod shaped body has a hook protrusion 46 at the end opposite the hinge. The rod can also be formed without the hook protrusion.

Figure 9:
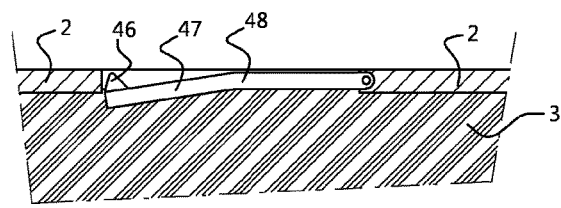
FIG. 9 shows an alternative retaining member to the one shown in FIGS. 7 and 8.

In FIG. 9 is shown an embodiment wherein the retention member is formed as a rod shaped body 47, like the previous embodiment of FIG. 7 but with a bend 48 in it. This bend 48 in the rod results in that the hook protrusion 46 does not extend beyond the outer surface of the casing 2. The rod will be pressed slightly in the intumescent material 3.

Figure 10:
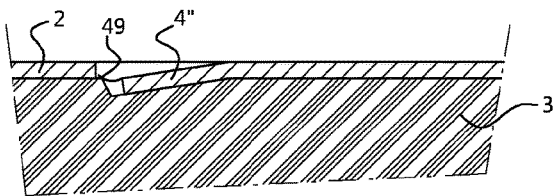
FIG. 10 shows yet another embodiment where a retaining member is formed in the sleeve casing.

It is for example possible to form the retention member as a lip 4" which is integrally formed with the casing 2, like in the embodiment of FIGS. 1-5, but which is provided with a bent edge portion 49 as is shown in FIG. 10. The bent edge portion 49 constitutes a hook protrusion. To ensure that the hook protrusion does not extend beyond the surface of the casing 2, the lip 4" is slightly bent inwardly in the non-actuated state as is shown in FIG. 10.

The embodiments shown here are to be considered as non-limiting examples. Also other embodiments are conceivable within the scope of the invention.

The invention claimed is:

1. A partition penetrated by a duct, the partition having a passage through which the duct passes, and a fire stop sleeve that is positioned in the passage and arranged around the duct, the fire stop sleeve comprising a metal casing having a tubular form and one or more elements of intumescent material arranged on a side of the casing facing the duct,
   wherein the casing has at least one bendable lip formed therein, the lip being integrally connected with the casing and being defined by a cutout in the casing which partially surrounds the lip, the lip lying in the plane of the casing and being actuable by the intumescent material such that, in the occasion that swelling of the intumescent material occurs, the lip is bent out of the plane of the casing and moved radially outward towards engagement with a passage wall in the partition so as to retain the sleeve in the passage.

2. The partition according to claim 1, wherein the sleeve has multiple bendable lips arranged distributed over the surface of the casing.

3. The partition according to claim 2, wherein the bendable lips are arranged in a distribution over a tangential direction of the casing.

4. The partition according to claim 2, wherein the bendable lips are arranged in a distribution over an axial direction of the casing.

* * * * *